INVENTORS
LORING P. CROSMAN
FRANCIS B. HANNON
BY
Ralph E. Bitner
ATTORNEY

Feb. 5, 1957 L. P. CROSMAN ET AL 2,780,408
ELECTRONIC ACCUMULATOR
Filed June 22, 1951 8 Sheets-Sheet 3

INVENTORS
LORING P. CROSMAN
FRANCIS B. HANNON
BY Ralph E. Bitner.
ATTORNEY

Feb. 5, 1957 L. P. CROSMAN ET AL 2,780,408
ELECTRONIC ACCUMULATOR
Filed June 22, 1951 8 Sheets-Sheet 6

INVENTORS
LORING P. CROSMAN
FRANCIS B. HANNON
BY
Ralph E. Bitner
ATTORNEY

Feb. 5, 1957   L. P. CROSMAN ET AL   2,780,408
ELECTRONIC ACCUMULATOR
Filed June 22, 1951   8 Sheets-Sheet 8

*INVENTORS*
LORING P. CROSMAN
FRANCIS B. HANNON
BY
Ralph E. Bitner
ATTORNEY

United States Patent Office

2,780,408
Patented Feb. 5, 1957

2,780,408
ELECTRONIC ACCUMULATOR

Loring P. Crosman, Wilton, and Francis B. Hannon, Milford, Conn., assignors to Sperry Rand Corporation, a corporation of Delaware Application June 22, 1951, Serial No. 233,002

3 Claims. (Cl. 235—61)

This invention relates to electronic counters of the type used in large scale digital computing machines. It has specific reference to a counter arrangement comprising vacuum trigger tubes which can be used to add, subtract, and shift an accumulated digit from one accumulator to another.

Many types of electronic computers have been designed and used successfully. Some of these prior art arrangements include ten double triodes as trigger stages to accumulate digits from 0 to 9. Other arrangements include the so-called "series feed circuit" in which the trigger stages are given the values 1, 2, 4, and 8. Other counting arrangements comprise circuits using the binary system and circuits employing the bi-quinary notation.

One of the principal disadvantages of prior art circuits resides in the difficulty of subtracting one number from another. In some instances an additional set of gate tubes must be included in the counter arrangement in order to subtract. Other counters have used the single complement method of subtracting which comprises taking the nines complement of the minuend, adding the subtrahend, plus one, in order to get the difference. The present invention uses four trigger stages for recording digital values with some additional gate tubes for addition. The double complement method is used for subtraction which includes adding the nines complement of the minuend to the subtrahend, and then taking the nines complement of this sum in order to get the difference. The four trigger stages used in this method are given the values 1, 2, 2, 4, and the complement is obtained by a single actuating pulse delivered to all the control electrodes in all the stages.

One of the objects of this invention is to provide an improved electronic counter which avoids one or more of the disadvantages and limitations of prior art arrangements.

Another object of the invention is to provide an improved counting arrangement which employs a reduced number of tubes for accumulating digits in the denary or decimal system.

Another object of the invention is to simplify the process of subtraction.

Another object of the invention is to provide a simplified circuit, the digits of which may be shifted from one counter to another by a simple crystal diode arrangement.

Another object of the invention is to increase the speed of electronic counters so that computations may be performed at a greater rate.

The invention includes an electronic counter circuit employing four trigger stages having the value 1, 2, 2, 4, to accumulate digits in the denary system. Input conductors are provided so that single values are entered over one circuit and double-valued pulses are entered over another circuit, the proper disposition of such pulses being governed by a series of gate tubes. Means for actuating all the trigger stages are provided in order to obtain the complement of the recorded digit. Additional means for clearing or zeroizing the accumulator is provided by a single pulse conductor to all the trigger stages.

For a better understanding of the present invention, together with other and further objects thereof, reference is made to the following description taken in connection with the accompanying drawings.

Figure 5:
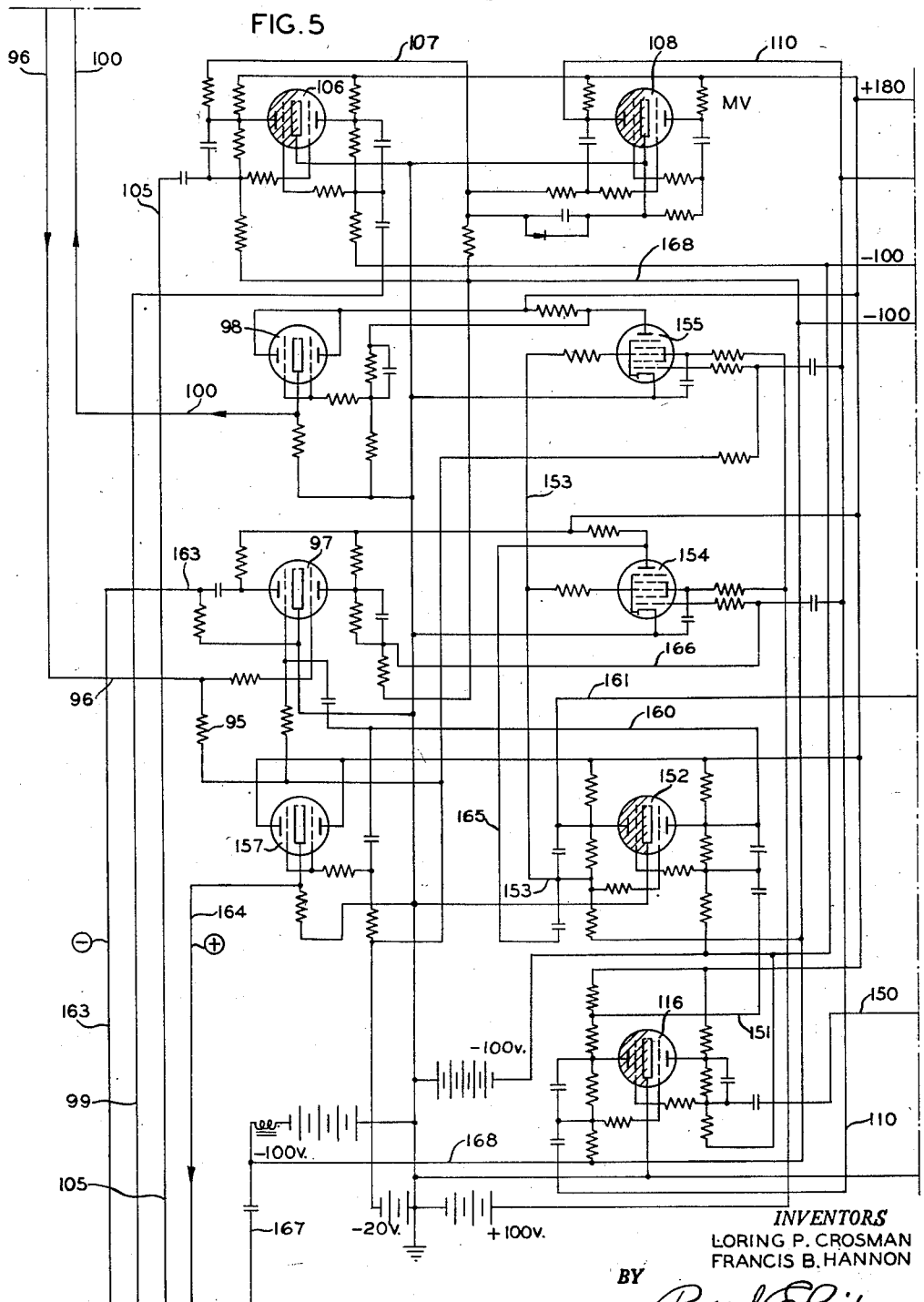
Figure 6:
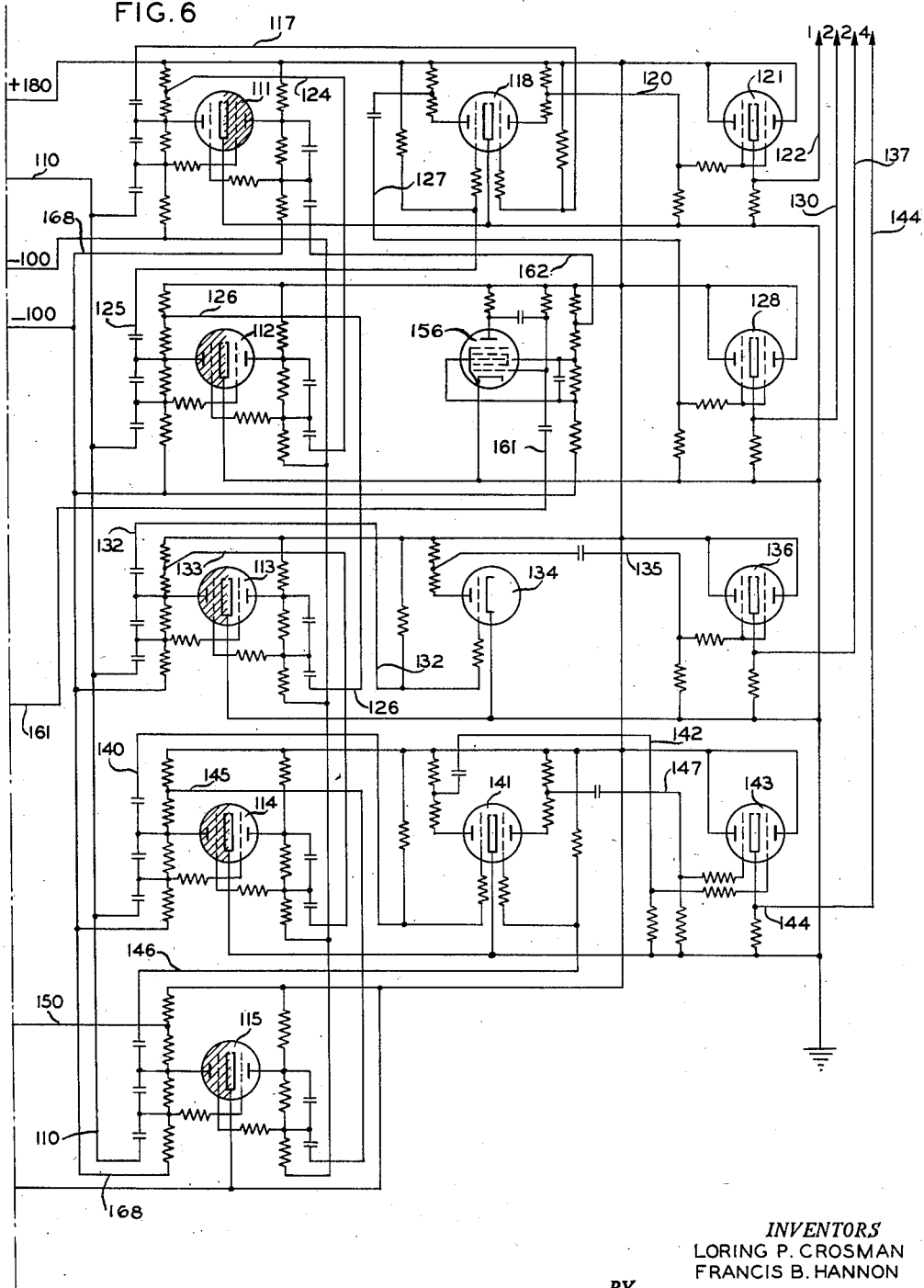

Figs. 5 and 6, taken together, represent a schematic diagram of connections of the pulse generator which generates pulses for accumulating values in the counters and also delivers carry signals and carry pulses.

Figure 7:
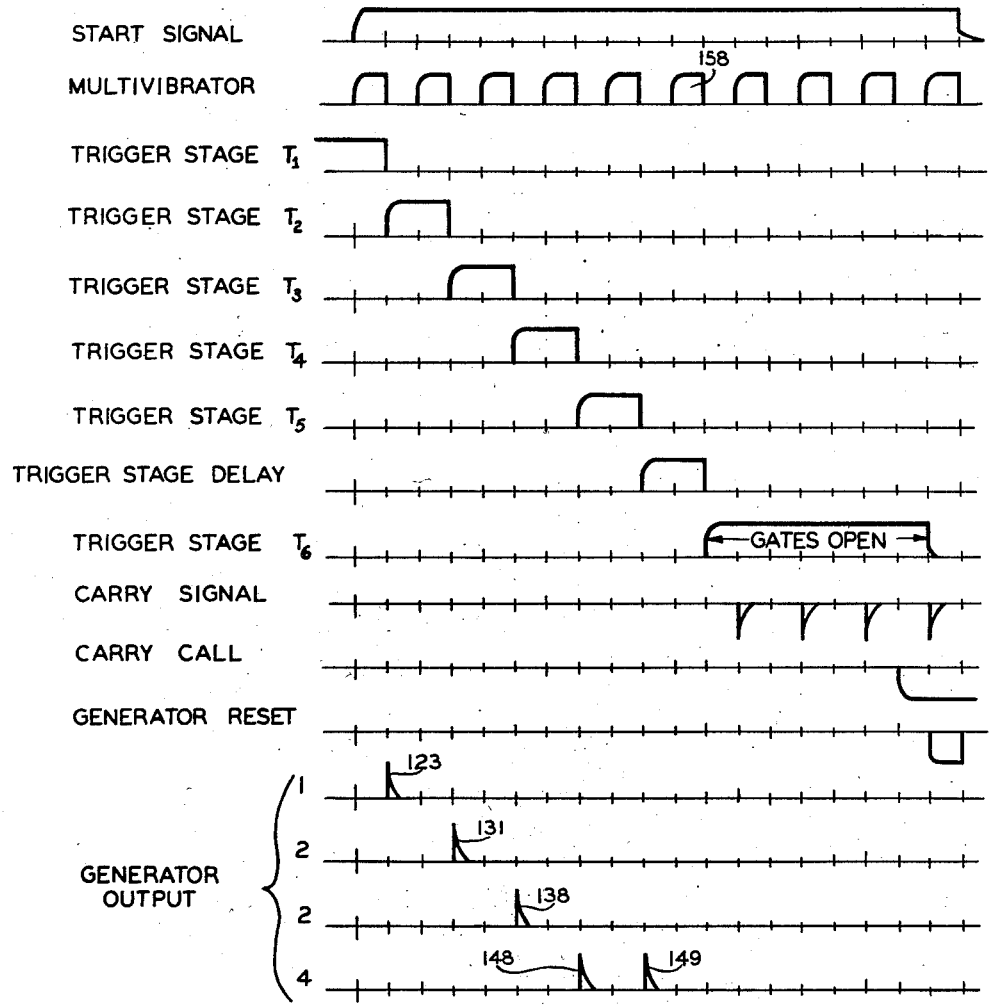

Fig. 7 is a chart indicating the timing sequence of pulses given off by the registration generator.

Figure 8:
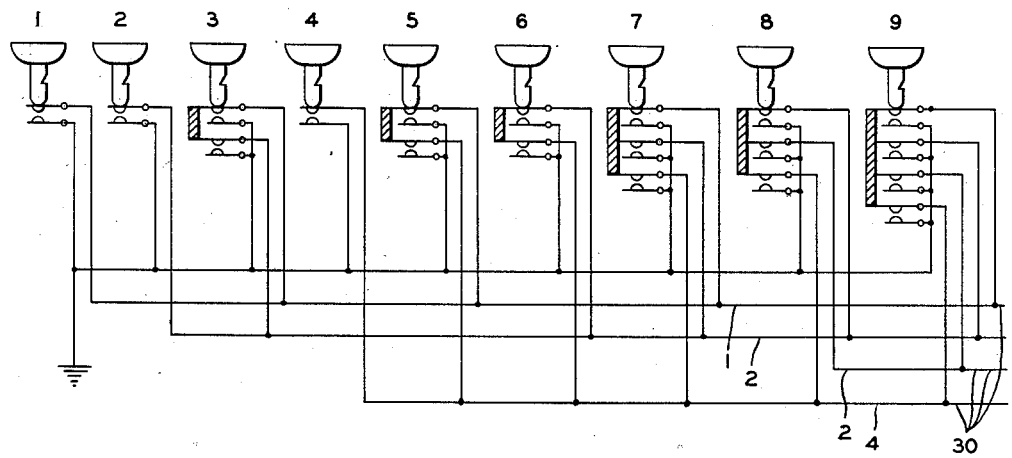

Fig. 8 is a schematic diagram of the keyboard.

Figure 9:
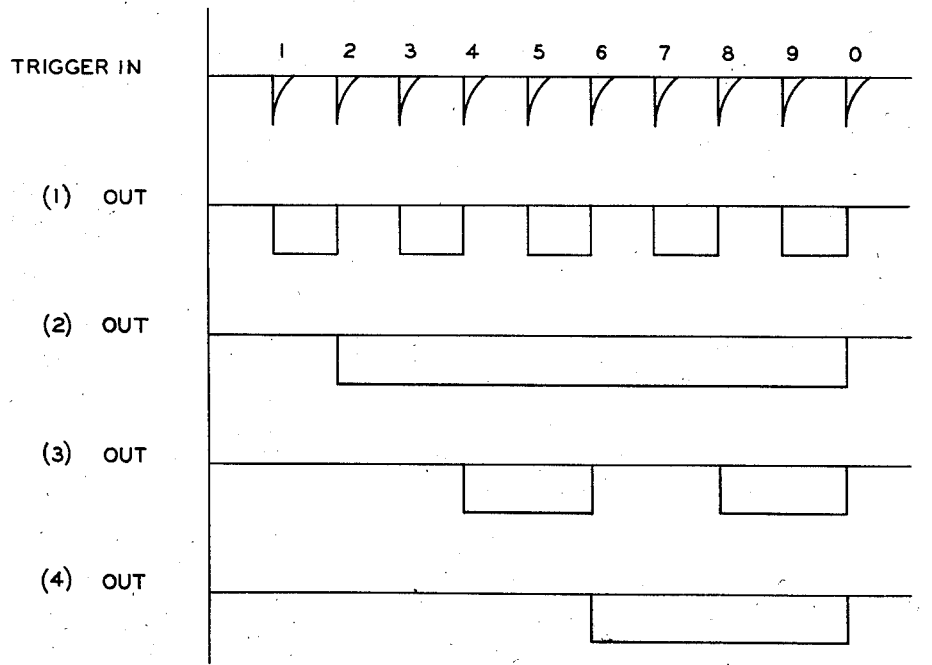

Fig. 9 is another chart indicating the timing sequence of trigger input and output pulses.

Figure 1:
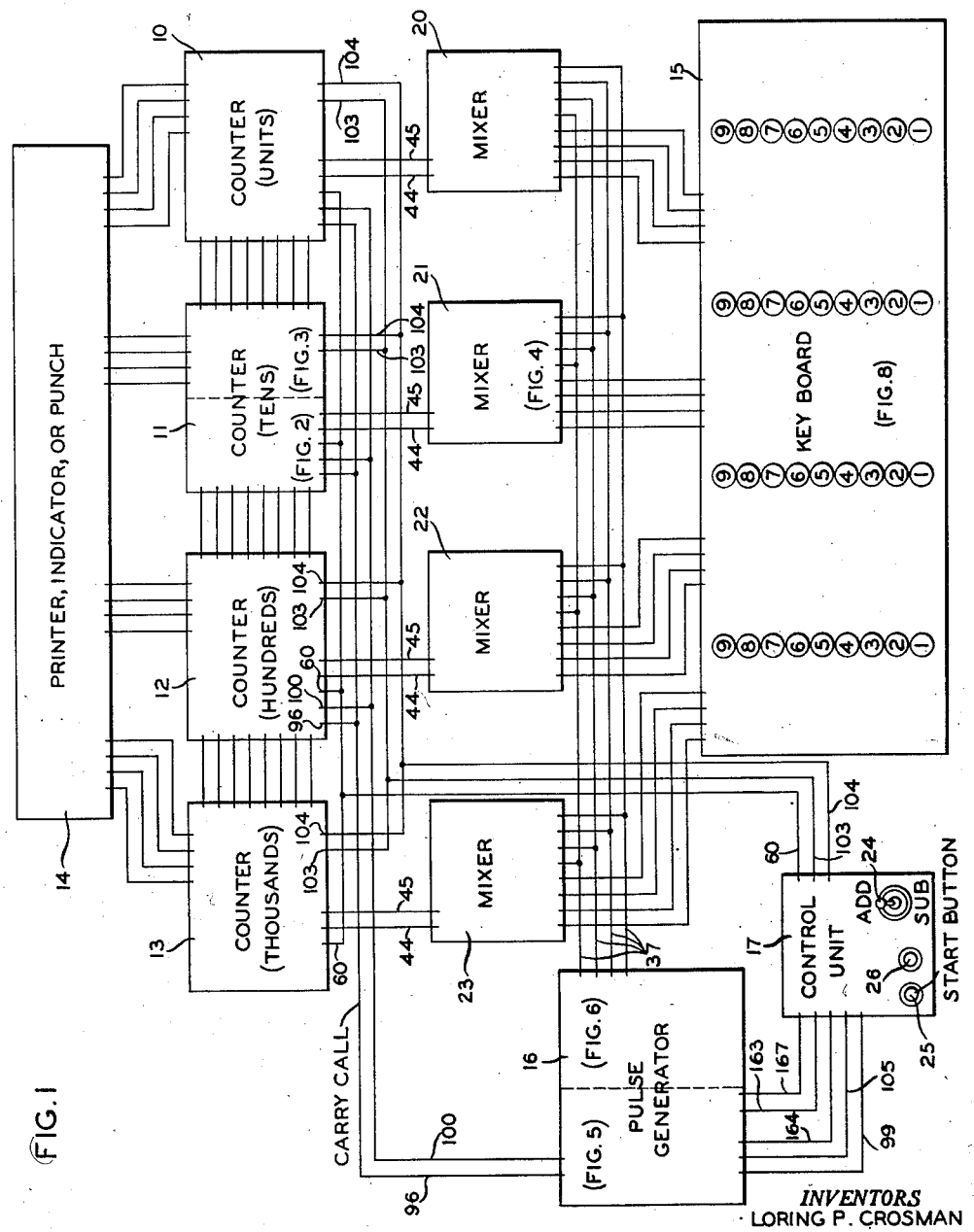
Fig. 1 is a schematic diagram of connections shown in block form which includes four counters, a keyboard, a pulse generator with a control unit, and four mixing stages for controlling the entry of digital values.

Referring now to Fig. 1, the calculator will be described in a general manner, neglecting for the moment the specific details of the invention. Counter circuits 10 to 13, inclusive, are employed to receive and record digit values in four denominational orders in the decimal or denary system. After the computation, adding or subtracting, is finished, the result contained in the counter units may be transferred to a receiver circuit 14 which may be either a printer, a visual indicator, or a punch mechanism for entering the data into a punched data card. A keyboard 15 is provided whereby digit values may be entered into the system. A pulse generator 16 is employed to generate all the pulses necessary for entering digit values into the counters and for performing necessary carry operations. A control unit 17 performs several control functions of the system including starting, stopping, adding, and subtracting. Since values ranging from 1 to 9 are entered in the keyboard and since a code arrangement 1-2-2-4 is used in the accumulators, it is necessary to use a mixer or coding circuit between the keyboard and the counters for the proper entry. These mixing circuits 20 to 23, inclusive, also provide preliminary storage means between the manually operated keyboard and the electronically operated counters. The operation of this simplified unit is as follows:

In order to add, a control switch 24 is pushed to the add position and a number is manually entered in the keyboard by depressing keys. Actuation of the keys in the keyboard causes gate circuits in the mixer units to be opened. These gate stages will be described in detail hereinafter. Then, a start button 25 in the control unit is pressed and the pulse generator transfers pulses through the gate circuits to the counter units in a predetermined sequence of operations. Now, if a second number is to be added, the control switch 24 is left in the add position and the second number is entered into the keyboard in the usual manner. A second actuation of the start button enters the second value into the counters in an additive manner. If, now, it is desired to subtract a number from the accumulated total, switch 24 is placed in the subtract position, the number is entered into the keyboard, the start button is depressed, and the third number is subtracted from the previously accumulated total. The counter circuits are arranged so that the output lines to the utilization circuit 14 always carry a register of accumulated values. Therefore, a printed total or sub-total may be obtained at any time during the above described operation. A clear or zeroizing button 26 is provided on the control unit so that the system may be cleared or zeroized at any time.

Now having described the system generally, reference is made to Fig. 8 wherein the keyboard circuit diagram is shown in diagrammatic manner. The term, control electrode, when used in this description indicates the grid element of the tube that is referred to. The keyboard enters the digit values and codes the digits in the 1—2—2'—4 system. Mechanical means are provided for latching any one of the keys in a depressed condition, this latch being removed at the conclusion of the entering sequence by a pulse from the pulse generator. The four conductors 30 from each order of the keyboard are connected to the lower left-hand corner of the mixer circuit, these lines 30 being indicated in detail in Fig. 4. Each one of the conductors 30 is applied to the control electrode of a triode enclosed in tubes 31, 32, 33, and 34. These four triodes each have their control electrodes connected to a point on a voltage divider, one end of which is connected to the negative end of a 75-volt battery, the positive end of the battery being connected to ground. The other end of the voltage dividers are connected to the lines 30, and as long as no key is depressed in the keyboard, the lines are disconnected and all the control electrodes assume a potential of —75 volts, thereby preventing any conduction between the anodes and cathodes. When one of the keys in the keyboard is depressed, one or more of the conductors 30 are connected to ground and the associated control electrodes in tubes 31 to 34 are raised in potential from —75 volts to —37.5 volts, a value still lower than the voltage necessary for anode-cathode conduction.

Coupled to storage tubes 31 to 34 are two output tubes 42 and 43; one for transmitting single valued pulses over an output conductor 44; the other for transmitting double valued pulses over a second output conductor 45. Conductors 44 and 45 are connected directly to the accumulator circuit which is shown in detail in Figs. 2 and 3.

*Accumulator*

The electronic accumulator includes four trigger stages 46, 47, 48, and 49, having the assigned digit values of 1, 2, 2, 4. These stages are the usual triggers which are operated by negative pulses to each of the control electrodes. Two bias lines 50 and 51 receive negative actuating pulses which are transmitted over conductors 103 and 104 and provide additional control. A single negative pulse applied to conductor 50 zeroizes all the triggers while a negative pulse on each conductor 50 and 51 actuates all the tubes and thereafter indicates the nines complement.

Associated with each accumulator trigger stage is an output triode 52, 53, 54, and 55, which acts as a buffer stage (cathode follower) and transmits the condition of the trigger stages to an output circuit. These output triodes are normally conducting and indicate an accumulated digit by a large reduction in transmitted voltage. They amplify the accumulator signal and also reduce the impedance of the circuit to a low value, thereby reducing the tendency to "cross-talk."

The digit trigger stages 46 to 49 are all coupled so that, under certain conditions, they will transfer an actuating pulse to another stage when their conductance has been transferred. However, it is obvious that such a transfer or carry should not occur when all the trigger stages in the accumulator have been actuated to obtain a complement. To block such an actuation a series of three gate amplifier tubes 56, 58, and 59 are employed. These triodes are biased for amplifier operation when the trigger stages are accumulating digit values. When it is desired to obtain a complement the triodes 56, 58 and 59 are biased to a non-transmitting value for the duration of the complementing actuation. The bias voltage is transmitted over a conductor 60 which is connected to the program circuit.

When amounts added or subtracted to the accumulator make it necessary to carry a unit value to the next higher order a carry trigger stage 61 is actuated. An indicator stage 62 notifies the pulse generator that a carry operation is called for so that the carry may be consummated at the end of the computing cycle. Three additional triodes 63, 64, and 65 are employed as input amplifiers, and their function and operation will be explained when a typical example is described.

Figure 2:
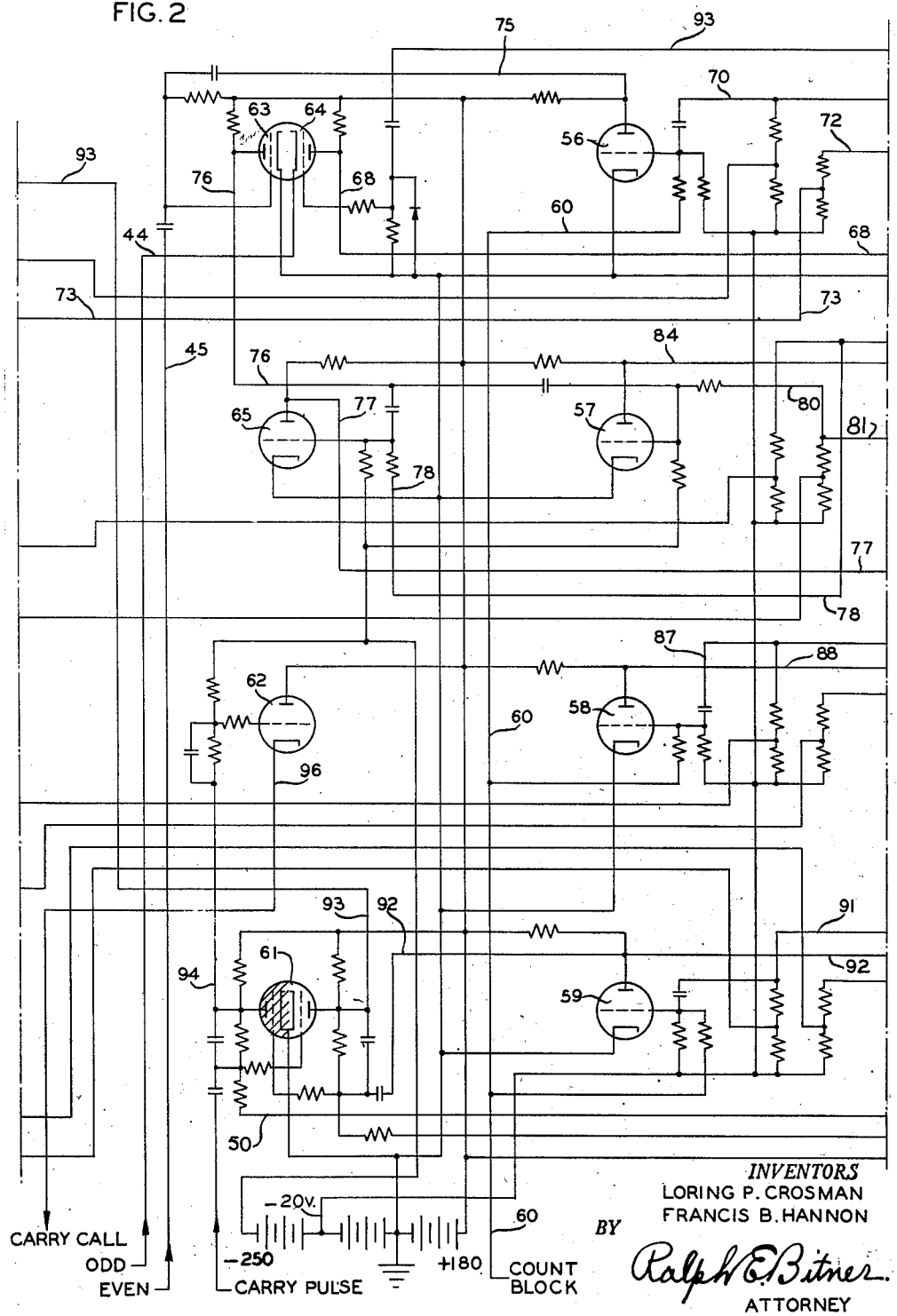
Figs. 2 and 3 are detailed diagrams of connection which show the complete arrangement of the counter unit.

The operation of the accumulator may be described by first assuming that a 1 is to be added to the circuit which has been zeroized. The 1 key in the keyboard is depressed and held down by a mechanical latch (not shown). This changes the bias on triode 31 (Fig. 4) from —75 volts to —37.5 volts. The add key 24 is pushed to the add position and the start button 25 is pressed. This starts the pulse generator and a series of positive pulses (see Fig. 9) is sent over conductors 37 to the mixer circuit. When the positive pulse of 50 volts is applied to the control electrode of triode 31 it overrides the 37.5 negative bias and produces a negative pulse in anode conductor 67 which is applied to stage 42 and results in a negative pulse being transmitted over conductor 44 which is connected to the cathode of triode 64 (Fig. 2). Similar pulses from the pulse generator are also applied to the three other storage tubes 32, 33, and 34, but because of the high negative bias on their control electrodes, the anode-cathode circuit does not conduct.

Triode 64 is adjusted for normal non-conduction. When the negative pulse is applied to the cathode, conduction results and a negative pulse is sent over anode conductor 68 to the control electrodes of trigger stage 46 to register a digit value of 1. When conduction is transferred in stage 46 a negative pulse is sent out on lines 70 and 71 to triodes 56 and 52, but there is no resulting action since both these triodes are normally biased to a value below anode conduction. Also a positive pulse is sent over conductors 72 and 73 to the next higher order accumulator circuit. This pulse causes no result because it is reduced by a voltage divider and is blocked by a diode rectifier 74.

Now, if a second 1 be added in the same manner, the pulses and the circuit functions will be the same up to the point where the trigger stage 46 is actuated. The second actuation transfers the conductance back to the left and, at the same time, causes a voltage rise on conductors 70 and 71, and a decrease in voltage on conductor 72. The voltage rise on conductor 70, applied through a capacitor to triode 56, causes momentary conduction and sends a negative pulse over anode conductor 75 to the control electrode of triode 63, which is normally conducting. This pulse causes a positive pulse to be sent over anode conductor 76 to the control electrodes of triodes 65 and 57, normally non-conducting gate tubes.

The control electrode of gate 65 is connected to the right-hand anode of trigger stage 47 by means of conductor 78 and, in a similar manner, the control electrode of gate 57 is connected to the left-hand anode of trigger stage 47 by means of conductors 80 and 81. These connections permit the trigger stage 47 to control the opening and closing of gates 57 and 65 and, because of the trigger characteristics, one of the gates is open while the other is closed.

In the case of a second 1 being registered in the accumulator, trigger stage 47 is conducting on the left and gate tube 65 is open. The positive pulse from triode 63, therefore, produces a negative pulse on anode conductor 77 and actuates trigger stage 47, causing it to conduct on the right-hand side. This action denotes that a 2 has been entered into the accumulator. The transfer of conductance raises the voltage on anode conductor 81 and lowers the voltage on anode conductor 82, thereby reducing the voltage on output lead 83 to give an indication of 2 in the load circuit.

A 2 is entered from the keyboard into the accumulator as follows: A depression of the 2 key grounds the associated conductor and reduces the negative bias on triode 32 (Fig. 4) from —75 volts to—37.5 volts. Then, when the start key is operated a double valued positive pulse, that is, representing a value of 2, is sent over the second conductor in cable 37 and a resulting negative pulse is transmitted to the control electrodes of stage 43 which in turn sends a negative pulse over conductor 45 to the control electrode of normally conducting triode 63, Fig. 2. This action causes a positive pulse to be transmitted over conductor 76 to gate stage 65, which is open, since it has been assumed that trigger stage 47 is conducting on the left and gate stage 57 is closed. As before, when a second 1 was entered, a negative pulse is sent over conductor 77 to actuate trigger stage 47 and indicate an accumulated value of 2.

If a second 2 should be added, the action is the same until the gate stages 65, 57 are reached. Now that a first 2 has been entered, trigger stage 47 is conducting on the right and gate 57 is open with gate 65 closed. The positive pulse on conductor 76, therefore, actuates gate 57 and sends a negative pulse over conductor 84 to both control electrodes of trigger stage 48, causing its conductance to be shifted to the right and lowering the voltage on conductor 85 to reduce the voltage on the control electrode of cathode follower 54 and to indicate a value of 2 to the load circuit by the lowered voltage on conductor 86. The accumulator now indicates a value of 4 since both conductors 83 and 86 transmit a reduced voltage to the load circuit 14.

If a third 2 should be added, the action is the same as described above until the negative pulse arrives at trigger stage 48 over conductor 84. The pulse actuates the trigger stage, but this time the conductance is shifted to the left-hand side, raising the potential of the right-hand anode and sending a positive pulse over conductor 87 to the control electrode of amplifier triode 58. This action sends a negative pulse over anode conductor 88 to the control electrodes of trigger stage 49, actuating it and transferring its conductance to the right-hand side. In this condition the right-hand anode of stage 49 has been reduced in voltage and this condition is communicated to cathode follower stage 55 by conductor 90, and as a result a reduced voltage is maintained on conductor 89 which represents a value of 4 in the load circuit 14. In this condition the accumulator shows a value of 6 since conductors 89 and 83 both carry reduced voltage.

A fourth 2 may be added in exactly the same way as the second, and trigger stage 48 will be actuated and its conductance shifted to the right-hand side, thereby sending a reduced voltage over conductor 85 to the control electrode of cathode follower tube 54.

It should be evident from the above explanation that the second single digit registration is exactly the same as the accumulation of a 2 since a second 1 value passes through triode 63 in the same manner as a value of 2.

If now another 2 is added to the accumulator to give a value of 10, the action is the same as the adding of the third 2 since a negative pulse on conductor 84 actuates trigger 48 and shifts its conductance to the left-hand side. Also, as in the previous case, a positive pulse is sent over conductor 87 to stage 58, and a negative pulse is sent over conductor 88 to trigger stage 49. Stage 49, however, is now conducting on the right side and the additional actuation will shift its conductance to the left, thereby sending a positive pulse over conductor 91 to triode amplifier 59 and sending a negative pulse over conductor 92 to trigger stage 61, which is designated as the carry stage. Conductor 92 is also connected to the right control electrode of stage 47 through a diode rectifier 101, and the negative pulse actuates the stage returning conduction to the left side which is normal. The above described circuit, which includes conductors 91 and 92 and amplifier stage 59, always returns the conductance of stages 47, 48, and 49 to normal (left side) when an accumulated value of 10 is reached or exceeded. When carry trigger stage 61 is actuated, its conductance is shifted to the right side which lowers the potential of the right anode and raises the potential of the left anode.

The potential of the right hand anode is communicated by conductor 93 to the next higher order. Since all accumulator circuits are substantially the same, the connection of conductor 93 in the next higher order circuit can be followed by tracing conductor 93A, which appears at the right hand edge of Fig. 3. This conductor may be traced to the control electrode of triode 64 (Fig. 2) where a unit digit value can normally be entered into the accumulator. However, at this time interval conductors 93 and 93A communicate a negative pulse which causes no effect in triode 64 and, therefore, there is no result in the higher order circuit because of the first actuation of carry stage 61. The first actuation also raises the potential of the left hand anode which is communicated over conductor 94 to amplifier stage 62. This stage is a cathode follower type of amplifier having its cathode resistor 95 in series with the cathode conductor 96, but situated in the registration generator circuit (Fig. 5). It should be borne in mind that the carry signal may occur any time during the addition operation, and the addition of the carry digit to the next higher order must be done after the addition of digits from the keyboard. The actuation of stage 61, therefore, is a storage action which stores the carry value until a later time, and the rise in voltage which is sent over conductor 96 to stage 97 is a signal to the pulse generator that a carry digit has been stored and should be added to the next higher order accumulator as soon as the addition process is finished.

Let it be assumed now that the addition action has been finished and the pulse generator, in reply to the call for carry, sends out a negative pulse from stage 98 (Fig. 5) over conductor 100 to the right hand control electrode of carry stage 61 (Fig. 2). This negative pulse actuates the carry stage and transfers its conductance to the left hand side, thereby sending a positive pulse over conductor 93 to the next higher order. This circuit may be traced as before over conductor 93A through Fig. 3 to triode 64 in Fig. 2. This time the pulse is positive and triode 64 will be actuated to cause a negative pulse to be sent over conductor 68 to the stage in the next higher order, which is similar to trigger stage 46, shown in Fig. 3. This actuation causes the higher order stage 46 to be actuated as described above, and to accumulate a digit value of 1 in the next higher order.

Figure 3:
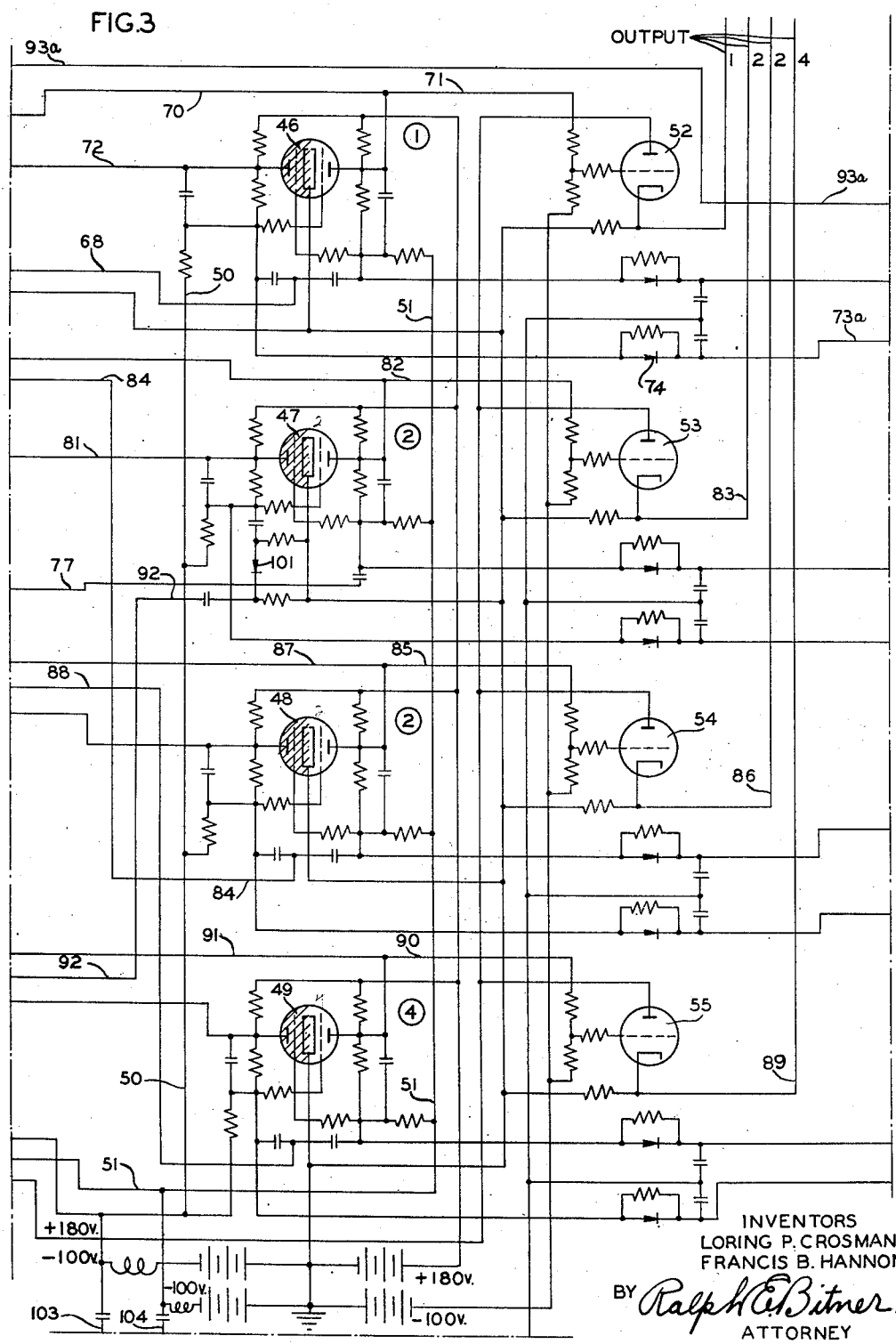

The above explanation indicates how accumulated values may be run into an accumulator and show a result which is equal to the sum of the accumulated values. The present type accumulator may also be used for subtraction by the double complement method. In order to explain the subtraction operation, let it be assumed that a digit value of 6 has been entered into the accumulator. After receiving this number the trigger stages 46 and 48 would be conducting on their left or normal side, while trigger stages 47 and 49 would be conducting on the right-hand side. If now it is desired to subtract a 3 from this value, switch 24 (Fig. 1) is thrown to the subtract position, a 3 key is depressed in the keyboard, and the start button is depressed. As soon as the start button makes contact, the control unit 17 transmits a strong negative pulse over conductors 103 and 104 (Fig. 3). These pulses are generated in a pulse generating circuit which is disclosed and claimed in pending patent application No. 194,225, filed November 6, 1950. It will be noted that conductor 103 is connected by way of conductor 50 to all the right control electrodes of accumulator stages 46, 47, 48, and 49, while conductor 104 is connected by way of conductor 51 to all the left control electrodes of the same stages. Because of these operating pulses stages 46 and 48, which were conducting on the left, will be actuated to conduct on the right, and stages 47 and 49, which were conducting on the right to give a count of 6, will be actuated to their normal position and will then conduct on the left. The accumulator now registers a value of 2 plus 1, or 3, which is the nines complement of the previously accumulated value of 6. Immediately after the application of the complement pulse as above, the subtrahend 3 which is to be subtracted and which we had previously entered into the keyboard is now added in the usual manner to the 3 complement now in the accumulator to give a result of 6 through circuits actuating stages 47 and 49, respectively representing values 2 and 4. At the conclusion of this addition operation the nine's complement of the 6 is taken to give the difference 3 representing the answer to the problem. To effect this latter action, the control unit 17, after the addition operation, again sends negative pulses over conductors 103 and 104 to all the control electrodes of the accumulator stages and thereupon each of the stages has its conductance transferred. This latter action normalizes stages 47 and 49, transferring their conductance from the right to the left; it also transfers conductance in stages 46 and 48 from the left to the right, representing respectively the values of 1 and 2, to effect a value of 3 which is the nine's complement of the 6 previously accumulated and is the answer to the problem.

If it is desired to subtract a second time, say 2 from the 3 now in the accumulator, the 2 is entered into the keyboard and the start button is depressed with the key 24 in subtract position. As above, a strong negative pulse over conductors 103 and 104 causes conductance in stages 46 and 48 now on the right to shift to the left and conductance in stages 47 and 49 to shift to the right to effect a register of 6, the nine's complement of 3. The subtrahend 2 is next added in usual manner, during which operation it is plain from the earlier description, stage 48 will be affected to conduct on the right and to cause an addition of 2 to the 6 to give a count of 8. Negative pulses over conductors 103 and 104 next cause a shift in conductance of tubes 47, 48 and 49 from the right to the left and causes stage 46 representing a value of 1 to conduct on the right and to effect a registration of 1 which is the nine's complement of 8 and the answer to the second subtraction problem. Actuation of control button 26 to send a negative pulse over conductor 103 will return all stages conducting on the right to their normal condition on the left.

It is quite evident that each time a subtracting operation is performed a complement must be obtained from the value in the accumulator stages, and this complement is the result of two concurrently applied pulses which actuate all the stages. Such actuation would ordinarily produce many other results, such as carry operations and transferred pulses to other stages. In order to block such pulses a high negative potential is applied over conductor 60 (from control unit 17) to three of the gate stages 56, 58, and 59, thereby disabling these stages and preventing any pulse from being transmitted through them. Immediately after the complement pulse has been applied the negative potential is removed from conductor 60 so that normal adding operations may be continued.

*Pulse generator*

Figure 4:
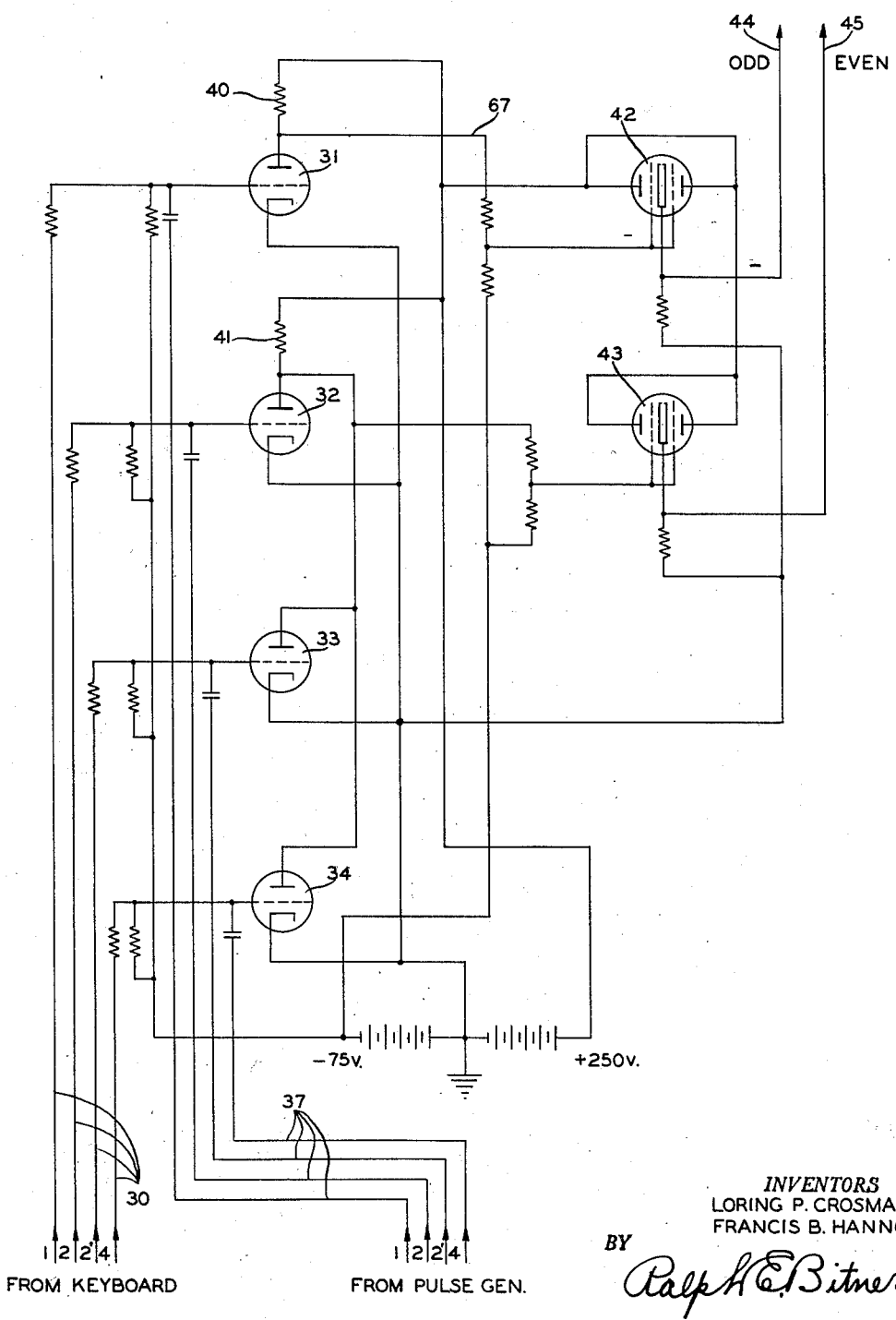
Fig. 4 is a diagram of connections of the mixer unit.

The pulse generator is not a part of this invention, but is especially designed to give pulses and control voltages which can be used by the present type of accumulator and, therefore, the circuit will be described in detail. The generator consists broadly of a multivibrator which is started by the start key, and is turned off automatically by a trigger tube after a series of trigger stages have been actuated. The pulse generator delivers a series of five pulses over four wires for the accumulation of digit values, as indicated at the bottom of the drawing in Fig. 7. These pulses are applied to the mixing circuit, as shown in Fig. 4, and their function and control have already been described. The pulse generator also supplies a number of negative pulses to operate and normalize carry stages which have been actuated by the accumulator during the addition or subtraction of numbers which have been entered into it. After the last carry an additional pulse is generated, which closes all the gates and resets certain stages of the pulse generator, and also turns off the multivibrator.

Referring now in greater detail to Figs. 5 and 6, the pulse generator comprises a start trigger stage 106, the output of which is delivered over conductor 107 to a multivibrator stage 108. This multivibrator is the usual type of double triode unstabilized circuit and produces square-top waves in a manner well known to the art. The multivibrator is connected to six trigger stages by means of conductor 110. These trigger stages (111–116, inclusive) in Figs. 5 and 6 are all wired in a similar manner, and consist of the usual double triode stabilized stages which are normally conducting on the left, with the exception of the first stage 111 which is normally conducting on the right.

In addition to the six trigger stages described above, a seventh trigger stage 152 is employed to start the operation of the carry stages if it is necessary to produce carries from one denominational order to another. Stage 152 controls two gate stages 154 and 155. These gates include a tube component which comprises the usual anode and cathode with five control electrodes or grids spaced between them. The fifth grid in this tube is the suppressor grid and is permanently connected inside the envelope to the cathode. Grids 2 and 4 are connected together and are given a permanent positive potential similar to the usual screen grid. Grids 1 and 3 are used as control electrodes, either one of which may independently control the current between the cathode and the anode. If both of these grids are biased at the same potential as the cathode, there will be a normal flow of current between the cathode and anode. If either one of the grids 2 or 3 are given a negative bias of 10 volts or more, the tube will be completely cut off and no anode current will flow.

The pulse generator circuit also includes a pentagrid trigger stage 156 (Fig. 6). This stage includes a tube and circuit commonly called a phantastron. The stage operates in a manner similar to a double triode connected as a partly unstabilized trigger, and a negative pulse supplied to the #1 grid will cause the tube to switch conductance from the cathode-anode to the cathode-screen for a time interval determined by the circuit constants, in this case seven microseconds. The pulse generator circuit also includes an output triode 98 which transmits one or more carry pulses to the carry stages in all denominational orders, and a double triode stage 97, the right-hand portion of which receives and transmits a carry call signal from any one of the accumulator circuits, indicating that carry pulses are necessary and must be sent out in order to complete the carry operation. The left-hand portion of stage 97 is used to receive and transmit a signal which is sent to the program circuit when all the carry digits have been added and the carry operation is complete.

Another amplifier stage 157 is used to receive and transmit a pulse which is also sent to the program circuit when the carry operation is complete. The two signals sent out from tubes 97 and 157 are necessary for the operation of the program circuit, one being a positive pulse, the other being a negative pulse.

The operation of the pulse generator is as follows: A start impulse is received from the control unit over conductor 99. This is a negative pulse and is applied to the left control electrode of stage 106, actuating the stage and causing the conductance to be transferred to the right side. This raises the potential of the left anode and applies an increased voltage over conductor 107, which changes the bias on the right control electrode of multivibrator stage 108, starting the multivibrator and sending out a train of pulses which are sent over conductor 110 to all six of the trigger stages 111 to 116, and also to gates stages 154 and 155.

The multivibrator pulses produce an approximate square-topped wave (see Fig. 7) which is transmitted over conductor 110 and is applied, through blocking capacitors, to the right control electrodes of trigger stages 111 to 116, inclusive, and to gate stages 154 and 155. The leading edge of each wave produces pulse which has no effect on the trigger stages since these circuits are quite insensitive to positive pulses. The positive pulses cause no effect in the gate stages 154 and 155 because these stages are normally biased far below conduction.

The trailing edge of each multivibrator pulse produces a sharp negative pulse on the right-hand control electrodes of the trigger stages, but when the first negative pulse is applied only stage 111 is conductive on the right and it will be the only stage to be actuated. This actuation sends a negative pulse over conductor 117 to the right side of amplifier tube 118 which then transmits a positive pulse over conductor 120 to both control electrodes of cathode follower amplifier 121, the result being a positive pulse over output conductor 122. This pulse is shown in Fig. 7 at the bottom of the chart, and is designated 123.

When trigger stage 111 is actuated and transfers its conduction to the left-hand triode it also sends out a negative pulse over conductor 124, which is applied to the left-hand control electrode of trigger stage 112. This pulse causes the trigger stage to transfer its conductance from the left to the right side. When the transfer is made from left to right, positive pulses are sent out over conductors 125 and 126. The positive pulse over conductor 125 is applied to the left triode of stage 118 and causes no result because this amplifier is normally conducting with both control electrodes connected to the positive anode supply line through high resistors. In a similar manner the positive pulse over conductor 126 is applied to the control electrode of stage 115, but since the left side of this stage is already conducting, no result is obtained in this stage.

When the second negative multivibrator pulse is sent out over conductor 110 the only stage conducting on the right side at that time is stage 112. Its conductance is shifted to the left, and this time negative pulses are sent out over conductors 125 and 126. The negative pulse over 125 is applied to the left side of amplifier 118 and is then transmitted as a positive pulse over conductor 127 to cathode follower stage 128, sending out a positive pulse over output conductor 130. The character of this pulse is shown in the bottom portion of Fig. 7, and designated 131. The negative pulse sent out over conductor 126 is applied in a similar manner to the left side of trigger stage 113, thereby causing its conductance to shift to the right. At this time a positive pulse is sent out over conductors 132 and 133 in substantially the same manner as the positive pulses over conductors 125 and 126, and in a similar manner they cause no important results.

The third negative pulse sent out by the multivibrator actuates only stage 113 since at this time it is the only trigger stage conducting on the right side. The conductance is shifted back to the left, thereby sending out negative pulses over conductors 132 and 133. The negative pulse over conductor 132 is applied to the control electrode of amplifier tube 134, which causes a positive pulse to be sent over conductor 135 to cathode follower stage 136, and in a similar manner, a positive pulse is sent out over output conductor 137. The timing of this pulse is shown in the bottom of Fig. 7, designated 138.

The fourth and fifth pulses sent out by the multivibrator stage 108 are applied in a similar manner to trigger stages 114 and 115, which function in the same manner as stages 111, 112, and 113. The actuation of stage 114 sends a negative pulse over conductor 140 to the left control electrode of amplifier stage 141 which is transmitted as a positive pulse over conductor 142 to cathode follower stage 143, thereby transmitting a positive pulse over output conductor 144.

In the same manner as described above, a negative pulse is sent by stage 114 over conductor 145 to actuate stage 115 so that when the next multivibrator pulse is applied it will be actuated to transfer its conductance to the left and send a negative pulse over conductor 146 to the right control electrode of amplifier 141 and transmit a positive pulse over conductor 147 to cathode follower stage 143, to send out another pulse over the same conductor 144. The two pulses over conductor 144 are shown in the bottom portion of Fig. 7, designated 148, 149. These pulses, designated in Fig. 7 as generator outputs, are used to enter digit values into any or all the accumulator orders, the action of which has already been described, but since the multivibrator is used to develop output pulses for the actuation of carry stages, it continues its action and sends out another pulse which is applied over conductor 110 (Fig. 5) and transfers the conductance of stage 116 to the left, it having been transferred to the right by the negative pulse transmitted from stage 115 over conductor 150. When the conductance is transferred to the left, the negative pulse is sent over conductor 151 to the left control electrode of trigger stage 152. Trigger stage 116 causes no pulse output and no other result other than the actuation of stage 152 and, therefore, contributes no result to the operation of the pulse generator except that of a time delay. This delay is necessary in order to separate the application of digit pulses to the accumulator and the subsequent carry pulses which transfer the carry amounts from the carry stages to the next higher accumulator.

When trigger stage 152 is actuated and its conductance transferred to the right, an increase in voltage appears at the terminal of the left anode. Also, the right control electrode becomes more positive, changing in this case from a −25 volt to zero potential. This change in voltage is communicated over conductor 153 to gate stages 154 and 155, placing them in operating condition. It should be noted here that the #3 grids of these two gate stages are normally biased at −25 volts, a condition which cuts off the anode current in these stages, and the multivibrator pulses which were applied to the #1 grids had no effect up to the present time interval. By referring to Fig. 7 it can be seen that the first five multivibrator pulses are employed to generate and transmit the five generator pulses 123, 131, 138, 145, and 149. The sixth multivibrator pulse 158 actuated stage 152 and opened gates 154 and 155. When trigger stage 152 is first actuated, a negative pulse is sent over conductor 160 to the left control electrode of stage 97. This produces no result since this stage is normally non-conducting. A positive voltage is also sent over conductor 161 to stage 156 with no effect since this stage is sensitive to negative pulses only.

If there is no need for a carry pulse, the accumulators will signal this condition by an unchanged potential on conductor 96. This condition keeps the right control electrode of stage 97 at a cut-off potential and the anode of that triode is at its highest potential. The next positive multivibrator pulse applied to stage 154 causes an anode-cathode current and reduces the potential of the anode, sending a negative pulse over conductor 165 to trigger stage 152, actuating it and transferring its conductance to the left, its normal condition. This actuation sends a negative pulse over conductor 161 to phantastron stage 156, causing its plate to conduct for a short time interval (seven microseconds) and then return to its normal condition. During the interval when the plate conducts the screen, comprising grids 2 and 4, does not conduct and, therefore, its potential is first raised and then lowered. This change in potential is communicated by conductor 162 to stage 111 which transfers its conductance to the right or normal side when a negative pulse is applied to the left control electrode. At the same time a negative pulse is sent from stage 152 over conductor 161, a positive pulse is sent over conductor 160 to the left triode of stage 97 and to both control electrodes of tube 157, thereby sending a negative pulse over conductor 163 and a positive pulse over conductor 164. Both these pulses are transmitted to the control circuit to signify that the carry operation has been completed.

If any one or all of the accumulators has progressed through 9 to 0 a carry stage will be actuated in the accumulator circuit and such actuation will be signalled by a positive potential on conductor 96 which raises the potential of the right control electrode of stage 97 and reduces the potential of the right anode. This lowered potential is transmitted over conductor 166 to the control electrode of stage 154, thereby keeping its potential far below the conducting condition and preventing trigger stage 152 from being normalized until after all the carries have been satisfied.

After each addition or subtraction the indicator 14 shows the result, and if this unit contains a recording device such as a printer or punch, the result can be recorded for future use. Recording the result does not clear the accumulators, however, and a control button 26 on the control unit 17 is operated to clear the accumulator circuits and condition the calculator for the next problem. The control button 26 closes a circuit which sends a strong negative pulse over conductor 103 to all the accumulator circuits. This negative pulse, applied over conductor 50 in each circuit, to trigger stages 46, 47, 48, 49, and 61, actuates all that have been conducting on the right and transfers the conductance to the left.

A zeroize or clear signal is not generally necessary for the trigger stages in the pulse generator since at the end of each completed cycle the trigger stages will be in their correct starting condition. However, to make sure that all trigger stages are in their correct condition, especially after an incompleted operation or after the circuit has been turned on, a strong negative pulse is sent from the control unit 17 over conductors 167 and 168 to all nine of the trigger stages in the pulse generator unit (Figs. 5 and 6), causing them all to conduct on the left side except stage 111 which is normally conducting on the right. This pulse is sent out just before each operation begins.

From the above description it will be evident that the invention provides an electronic circuit which can be used for high speed addition and subtraction.

While there have been described and illustrated specific embodiments of the invention, it will be obvious that various changes and modifications may be made therein without departing from the field of the invention which should be limited only by the scope of the appended claims.

What is claimed is:

1. An electronic accumulator for adding and subtracting received digit values comprising; four electronic trigger stages having assigned digit values of one, two, two, and four; an additional electronic trigger stage for storing a carry digit which is to be added to the next higher order accumulator; each of said trigger stages having a normal condition and an actuated condition of conductive stability; means in each trigger stage responsive to a negative electrical pulse to change from either condition of stability to the other; an input circuit for receiving electrical pulses and transmitting them to a trigger stage having an assigned value of unity; coupling circuits between the trigger stages and the carry trigger stage for transmitting an actuating electrical pulse to the next higher valued stage when a stage is changed from its actuated condition to its normal condition; said coupling circuits each including an amplifier gate stage which may be converted to a non-conductive condition by the application of a control potential; circuit means for applying an actuating pulse to all trigger stages to change their conditions of conductive stability to record a nines complement of the previously recorded value; and control means for applying the control potential to all of said amplifier gate stages to convert them to a non-conductive condition during the time the trigger stages are being actuated to show a nines complement.

2. An electronic accumulator for adding and subtracting received digit values comprising; four electronic trigger stages having assigned digit values of one, two, two, and four; each of said stages having a normal condition and an actuated condition of conductive stability; means in each trigger stage responsive to a negative electrical pulse to change from either condition of stability to the other; a first input circuit for receiving electrical pulses representing a value of one and transmitting them to a trigger stage having an assigned value of unity; a second input circuit for receiving electrical pulses representing a value of two and transmitting them to a trigger stage having an assigned value of two; coupling circuits between trigger stages for transmitting an actuating electrical pulse to the next higher valued stage when a stage is changed from its actuated condition to its normal condition; a normalizing circuit common to all trigger stages for the application of a pulse to change from an actuated condition to a normal condition of stability; an actuating circuit common to all trigger stages for the application of a pulse to change from a normal condition to an actuated condition of stability; and means for applying an actuating pulse to said normalizing circuit to change all actuated stages to their normal condition, thereby clearing the accumulator and recording a zero.

3. An electronic accumulator for adding and subtracting received digit values comprising; four electronic trigger stages having assigned digit values of one, two, two, and our; each of said stages having a normal condition and an actuated condition of conductive stability; means in each trigger stage responsive to a negative electrical pulse to change from either condition of stability to the other; a first input circuit for receiving electrical pulses representing a value of one and transmitting them to a trigger stage having an assigned value of unity; a second input circuit for receiving electrical pulses representing a value of two and transmitting them to one of the two trigger stages having an assigned digit value of two; said second input circuit including two amplifier gate stages, one for each trigger stage; control means including one of the two trigger stages having an assigned value of two for said gate stages for applying the first accumulated digit value of two to the trigger stage included in the control means and thereafter, for applying the next four accumulated digit values of two to the other trigger stage having an assigned value of two; coupling circuits between trigger stages for transmitting an actuating electrical pulse to the next higher valued stage when a stage is changed from its actuated condition to its normal condition; and circuit means for applying an actuating pulse to all trigger stages to change their conditions of conductive stability to record a nines complement of the previously recorded value.

References Cited in the file of this patent

UNITED STATES PATENTS

| | | |
|---|---|---|
| 2,484,115 | Palmer et al. | Oct. 11, 1949 |
| 2,514,035 | Dickinson | July 4, 1950 |
| 2,536,917 | Dickinson | Jan. 2, 1951 |
| 2,562,591 | Wagner et al. | July 31, 1951 |
| 2,624,507 | Phelps | Jan. 6, 1953 |
| 2,626,752 | Williams | Jan. 27, 1953 |
| 2,703,202 | Cartwright | Mar. 1, 1955 |

OTHER REFERENCES

High-Speed Computing Devices, Engineering Research Association; McGraw-Hill Publishing Co., copyright July 28, 1950, pages 297–299.